UNITED STATES PATENT OFFICE.

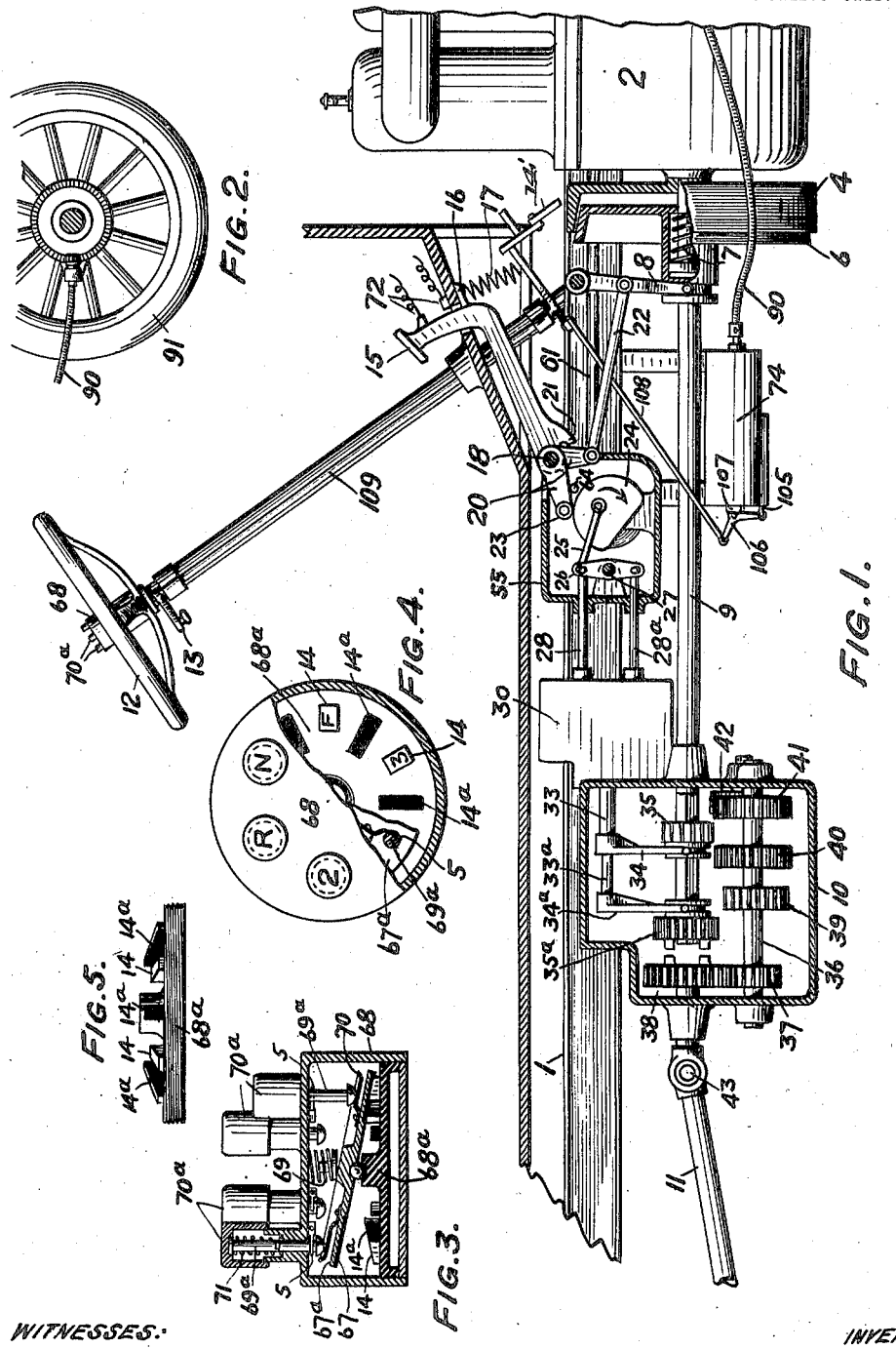

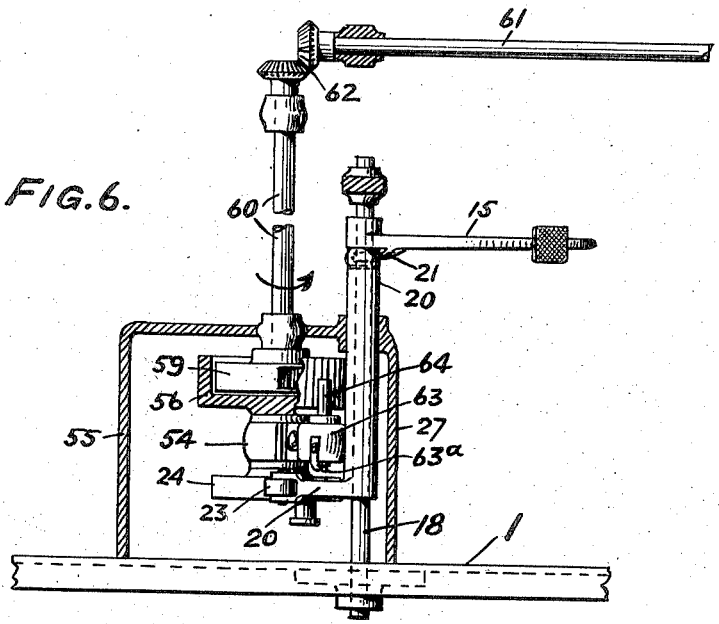
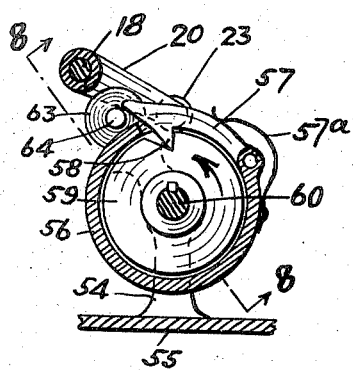
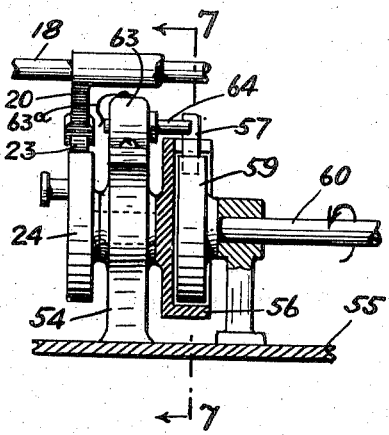

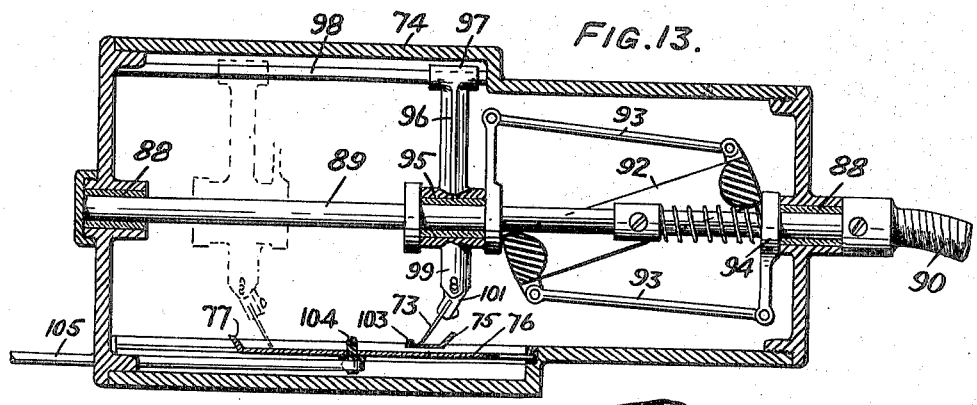

JOHN H. STORTZ, OF PHILADELPHIA, PENNSYLVANIA, ASSIGNOR TO STORTZ GEAR SHIFT COMPANY, OF WILMINGTON, DELAWARE.

GEAR-SHIFTING APPARATUS.

1,315,255.   Specification of Letters Patent.   Patented Sept. 9, 1919.

Application filed July 21, 1914. Serial No. 852,320.

*To all whom it may concern:*

Be it known that I, JOHN H. STORTZ, a citizen of the United States, and a resident of Philadelphia, in the county of Philadelphia and State of Pennsylvania, have invented certain new and useful Improvements in Gear-Shifting Apparatus, of which the following is a specification.

This invention relates to gear shifting apparatus, and especially such as are adapted to cause an interchange in the gearing of a motor driven vehicle for the purpose of changing its speed, and the chief object of this invention is to utilize the power of the motor for that purpose, *i. e.*, to utilize the power of the motor to operate the speed changing devices.

One of the objects of this invention is to utilize the power of the motor for effecting the change of speed of a vehicle while the power is thrown off the vehicle.

Another object of this invention is to prevent the shifting of the speed changing devices, when the vehicle is driven by the motor.

A further object of this invention is to control the speed changing devices by electromagnets, and to operate said devices by means of the motor itself.

A further object of this invention is to provide means whereby the speed of a vehicle may be controlled either manually or automatically.

A still further object of this invention is to utilize the power of the motor to disconnect it from the vehicle.

With these and other objects in view this invention comprises the method and means hereinafter described, a preferred form of which is illustrated in the accompanying drawing, and embraced within the scope of the appended claims.

Figure 11:
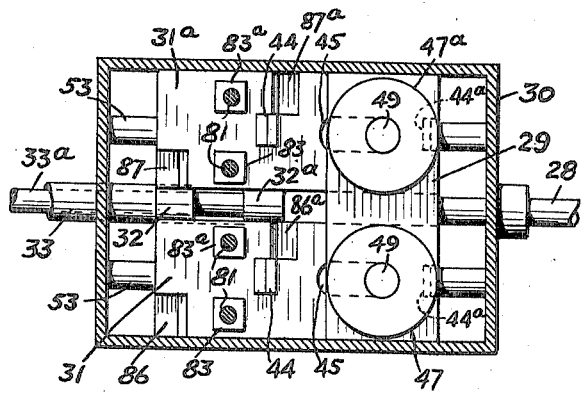
Figure 12:
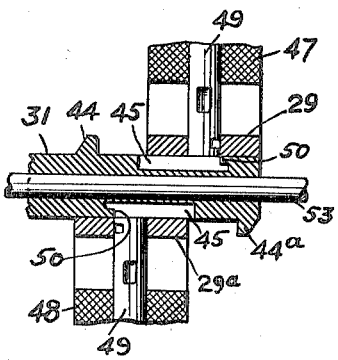
Figure 9:
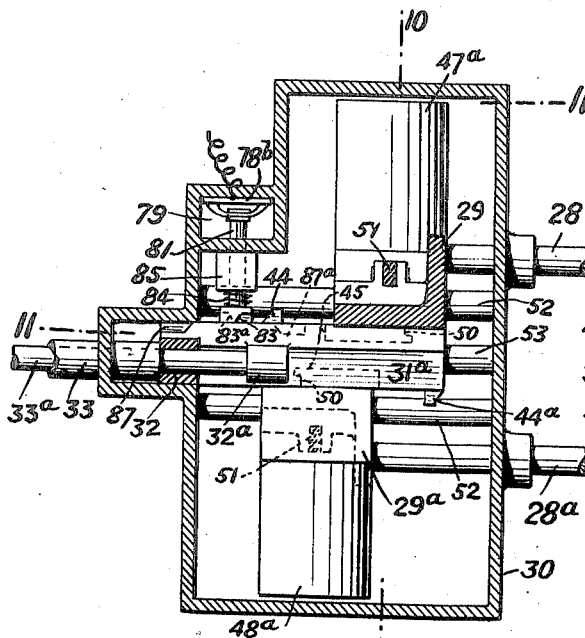
Figure 10:
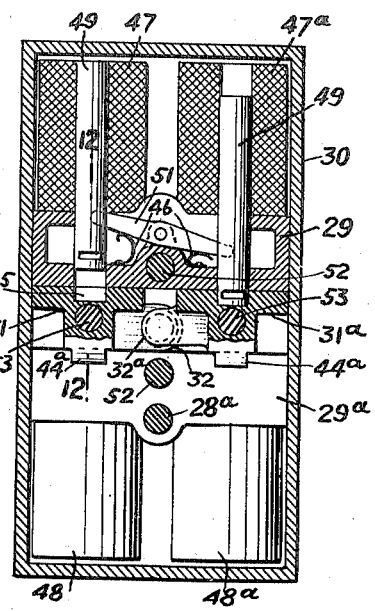

In the said drawing:—Figure 1 is a vertical side elevation of the central portion of an automobile provided with my improved means, whereby my method is carried out; Fig. 2 is a view of one of the front wheels of the automobile showing a portion of a flexible shaft in connection with Fig. 1; Fig. 3 is a section of an electric switch in connection therewith; Fig. 4 is a broken plan view thereof; Fig. 5 is an elevation of the stationary element thereof; Fig. 6 is a plan view partly in section of crank mechanism adapted to connect the timing shaft of the motor with the gear shifting mechanism; Fig. 7 is a section thereof on the line 7—7 of Fig. 8; Fig. 8 is a section thereof on the line 8—8 of Fig. 7; Fig. 9 is a side elevation, partly in section, of an electromagnetic coupling between the gear shifting and crank mechanisms; Fig. 10 is a section on the line 10—10 of Fig. 9; Fig. 11 is a section on the line 11—11 of Fig. 9; Fig. 12 is a section on the line 12—12 of Fig. 10; Fig. 13 is a section of a speed governing switch; Fig. 14 is an enlarged section of the switch portion thereof; Fig. 15 is an enlarged view thereof at right angles with Fig. 14; and Fig. 16 is a diagrammatic view of the electromagnet in connection with my improved method.

In the said drawing; 1 represents the chassis of an automobile; 2 a fluid motor, 4 its fly wheel, 6 a clutch, 7 a spring adapted to couple the clutch with the fly wheel, 8 a lever adapted to uncouple the clutch from the fly wheel, 9 a shaft connecting the clutch with the system of interchangeable gears mounted in the box 10, 11 a shaft connecting the gears with the rear axle (not shown). 12 is the steering gear, 13 the motor controlling handle and 15 a foot pedal provided with a lug 16, above an expansion spring 17, attached to the chassis. The pedal 15 is fulcrumed on a shaft 18. On the shaft 18 is mounted a bell crank 20, provided with an arm adapted to be operated by a nose 21 of the pedal, and pivotally connected by a rod 22 with the clutch lever 8 and with an arm carrying a roller 23.

A crank disk 24 is provided with a cam surface for the roller 23, said cam surface being partly curved and adapted to prevent the roller 23 from transmitting motion to its bell crank 20 and partly straight to cause the roller to transmit said motion. The crank disk 24 is pivotally connected by a rod 25 with a lever 26, fulcrumed on a bracket 27 inside the crank box. The arms of the lever 26 are connected by rods 28, and 28ª with sliding plates 29, and 29ª mounted in the box 30. Between the plates 29, and 29ª are mounted in alinement a pair of slides 31 and 31ª, respectively, connected by a collar 32 with a tubular rod 33, and by a collar 32ª with a rod 33ª, projecting through the tube 33. The tube 33 is provided with a shifter 34 and the rod 33ª with a shifter 34ª.

On the clutch shaft 9, inside the gear box 10, is slidingly keyed a gear 35 adapted to be shifted by the shifter 34 and a gear 35ª adapted to be shifted by the shifter 34ª. Inside the box is mounted a counter shaft 36 on which is fixedly mounted a gear 37 in mesh with a gear 38 adapted to be coupled with the gear 35ª when said gear is shifted in its direction, with a gear 39 adapted to mesh with the gear 35ª when said gear is shifted in its direction, with a gear 40 adapted to mesh with the gear 35 when said gear is shifted in its direction and with a gear 41 in mesh with an idler 42 adapted to mesh with the gear 35 when said gear is shifted in its direction. The gear 38 is connected by a universal coupling 43 with the rear axle driving shaft 11.

Each of the slides 31, and 31ª is provided with a downwardly projecting tooth 44ª, and with an upwardly projecting tooth 44 with an elongated recess 45 in its bottom, and a similar recess on its top.

On top of the plate 29 are mounted in alinement two solenoids 47 and 47ª, and from the plate 29ª are suspended similar solenoids 48 and 48ª. The solenoids are wound on cores each carrying a plunger 49. The plates 29 and 29ª are provided with perforations corresponding with the recesses 45 wherein said plungers are adapted to enter. Each plunger is provided with a recess for a lip 50 of the slides 31 and 31ª.

The top plungers are provided with pockets for the arms of a beam 51, centrally fulcrumed on the plate 29, which arms rest on bar springs 46, and the bottom plungers are similarly connected by a similar beam similarly supported. The plates 29 and 29ª are slidingly mounted on rods 52, and the plates 31 and 31ª are slidingly mounted on rods 53.

The cam crank 24 is provided with a journal supported by a bearing 54 of the box 55 which journal connects the crank with a cylindrical casing 56. On the casing is pivoted one end of a hook 57 whose opposite end projects outwardly of the casing and is provided with a downwardly projecting tooth 58. Inside the casing is mounted a disk 59 provided with a notch for the tooth 58. The disk 59 is carried by a shaft 60 which is driven by the motor driven timing shaft 61 by means of the pair of bevel gears 62.

On the bearing 54 is mounted a solenoid 63 wound on a coil which carries a plunger 64 adapted to project under the projecting portion of the hook 57.

A source of electric current 65, is connected by conductors with the solenoid 63 and with a terminal 67 shown diagrammatically in Fig. 16. Said terminal 67 is in the form of a conductor ring, shown in section in Fig. 3, and suspended from an insulating disk 67ª. The disk is mounted inside a switch box 68 over a central pivot of a stationary insulator disk 68ª and under a coil spring 69 suspended from the top of the box.

The top of the box is perforated, each perforation being surrounded by a lug through which is projected a stem of a button 69ª which is terminated by a head adapted to press against a spring 70 mounted on the disk 67ª. On top of each stem is mounted a cap 70ª and around each stem is wound a spring 71 adapted to project the stem outwardly of the box until stopped by the head. On top of the disk 68ª and under the ring 67 are mounted alternately circuit terminals 14 and insulators 14ª. The tops of the terminals and insulators lie along the surface of a cone and permit the terminal 67ª to alternately make and break a circuit as it comes in contact with either a terminal or insulator thereunder.

The circuit terminals 14 correspond with the terminals marked, in Fig. 16, R, N, F, 1, 2 and 3, each being adapted to be connected with the terminal 67 by a corresponding button. Each button is adapted to be held in its depressed position by a finger 5, which consists of a strip of spring steel attached at one end to the under surface of the top of the box 68, its free end being adapted to slip into a notch or recess of the stem of the button which is brought into alinement therewith when a button is depressed. When a second button is depressed, then the swinging of the disk 67ª caused thereby forces the stem of the first depressed button outwardly and the adjacent finger 5 is forced to release the first depressed button which is then actuated to assume a final outward position by its spring coil 71. The stem adapted to connect the terminal 67 with the terminal marked N has no catch, and when depressed and released is immediately projected upwardly, so as to break the circuit.

As shown in Fig. 1, the box 68 is mount ed on top of the rod supporting the steering gear 12.

The terminal marked R is adapted to connect the source 65 in series with solenoid 47ª and solenoid 63 through the switch 72 operated by the pedal 15. The terminal marked N is adapted to connect the source 65 in series with the solenoid 63. The terminal marked F is adapted to connect the source 65 by way of a sliding terminal 73 and any one of the terminals 75, 76 and 77 of an automatic switch (to be described later) in series with the solenoid 48ª, the pedal switch 72, and the solenoid 63, by way of the terminal 76 in series with the solenoids 47 and 63, and by way of the terminal 77 in series with the solenoids 48 and 63. The terminal marked 1 is adapted to connect the source in series with the solenoids 48ª and 63 through the pedal switch 72. The terminal marked 2 is adapted to connect the source 65 in series with the solenoids 47 and 63. The terminal marked 3 is adapted to connect the source 65 in series with the solenoids 48 and 63.

The circuits of the solenoids 48ª and 47ª are automatically made and broken by the terminals 78 and 78ª making and breaking contact with the stationary terminal 78ᵇ of a butterfly switch, and the circuits of the solenoids 48 and 47 are similarly made and broken by the terminals 80, 80ª making and breaking contact with the terminal similar to the terminal 78ᵇ.

The said butterfly switches are mounted in alinement in a chamber 79 of the box 30 each consisting of a plate attached to the ceiling of the chamber and a cup thereunder which carries a stem projecting through the chamber floor and terminates into a block having a cam surface 83. A spring coil 84 is wound on the stem between the block and a collar 85 suspended from the floor of the chamber. The blocks of the terminals 78 and 78ª rest on top of the plate 31 which is provided with a cam recess 86, for the cam of the terminal 78 and with a recess 86ª for the cam of the terminal 78ª. The plate 31ª is provided with a cam recess 87 for the cam of the terminal 80ª, and with a cam recess 87ª for the cam of the terminal 80.

The automatic switch referred to above is mounted in a box 74 provided with bearings 88 for a shaft 89 which is connected by a flexible shaft 90 with one of the front wheels 91, as shown in Fig. 2. On the shaft 89 is slidingly mounted a collar on which is centrally pivoted a lever 92.

One arm of said lever is pivotally connected by a rod 93 with a collar 94 fixedly mounted on the shaft and the second arm is pivotally connected with the arm of a spool 95 slidingly keyed on said shaft. Centrally between the flanges of the spool is mounted a post 96 provided with a sleeve 97 which is slidingly mounted on a rod 98. The spool is also provided with a lug 99 which is bored to form a socket for the stem plunger 100, and a recess for the head of the plunger and a seat for a terminal carrier 101 pivoted on said plunger head. The plunger is carried by a spring coil 102 above its head and within the socket extending below the head is mounted a carrier pivotally connected with the head and carrying the switch terminal 73. Inside the box 74 and under the terminal 73 is fixedly mounted the terminal 75 which is provided with an insulator 103.

Under the terminal 75 is slidingly mounted the terminal 76 which is integral with the terminal 77, but separated therefrom by the insulator 104.

The insulator 104 is connected by a rod 105 with the arm of a bell crank 106, pivoted on a bracket 107 of the box 74 (shown in Fig. 1). The other arm of the bell crank is connected by a rod 108 with the rod 109 which carries the throttle handle 13 and is connected with the rod 14 leading to the carbureter.

In describing the operation of the vehicle equipped as described above it is assumed that the vehicle is at rest and can be started either forwardly or backwardly.

To start the vehicle ahead and to operate it by means of the controller 68, the operator depresses the pedal 15 to close the switch 72 and depresses a button adapted to connect the terminal 67 with the terminal marked 1 in Fig. 16. A circuit is thereby established through the solenoids 48ª and 63 in series with the source 65.

The current through the solenoid 48ª pulls in its plunger and the lever which has one of its arms in the recess of said plunger is caused to force the plunger of the solenoid 48 within the recess of the shifter slide 31.

If the motor be in motion or started by turning on its power by means of the handle 13, the gears 62 will transmit the motion of the timing shaft 61 to the shaft 60 to rotate it in the direction of the arrow. The plunger 64 having been pulled in by its solenoid 63 from under the hook 57, said hook is forced by the spring 57ª with its nose within the notch of the disk 59 mounted on the shaft 60. The casing 56 is thus made to rotate with the disk 59 and the crank 24 is thereby rotated in the direction of the arrow shown in Fig. 1. The rotary movement of the crank disk 24 is transmitted by the rod 25 and lever 26 to the rods 28 and 28ª causing them to reciprocate and to slide the plates 29 and 29ª in opposite directions. The rearward movement of the plate 29 from its position shown in Fig. 9 results in disconnecting the plunger of the solenoid 47ª from the slide 31ª, and as the circuit of the solenoid 47 is now open, said plunger is forced by its spring actuated lever 51 outwardly of the recess of the slide 31ª, while the plunger of the magnet 48ª causes the lever connecting it with the plunger of the magnet 48 to enter the recess of the slide 31. Should any of the speed changing gears be in mesh, then during the rearward movement of the plate 29 and the frontward movement of the plate 29ª the teeth of the slides 31 and 31ª will be struck by the plates. This causes the rods 33 and 33ª to push the shifters 34 and 34ª in opposite directions and the shifters cause the gears on the shaft 9 to move out of mesh with any of the other gears of the gear box 30. The further movement of the crank 24 reverses the direction of motion of the plates 29 and 29ª and as the plunger of the magnet 48 is within the recess of the shifter slide 31, the lip 50 of said slide will enter the recess of the plunger in alinement therewith, and said slide will be forced by said plunger frontwardly and cause the shifter 34 to move the gear 35 in mesh with the gear 40, getting the vehicle ready to start on the first speed.

The depression of the pedal 15 causes its nose 21 to press against the lower arm of the bell crank 20 resulting in said arm causing the lever 8 to pull the clutch member 6 rearwardly and out of frictional contact with the fly wheel 4. The operator now releases the pedal and the spring 17 causes it to open the switch 72 and to release the bell crank 20. The opening of the switch 72 breaks the circuit through the solenoids 48ᵃ and 63, and the plunger 64 is forced by its spring 63ª under the projecting portion of the hook 57. The hook is thus caused to ride on the plunger whereby its nose is forced out of the notch of the disk 59, allowing the crank 24 to come to a stop with the middle of its plain surface under the roller 23.

The clutch spring 7 is now free to force the member 6 in frictional contact with the fly wheel 4 and the vehicle now starts forward on its first or slow speed.

To change to the second or next higher speed, another button is depressed, which is adapted to cause contact between the terminal 67 and the terminal marked 2 and at the same time to break contact between said terminal 67 and the terminal marked 1.

This establishes a circuit through the solenoids 47 and 63 in series with the source, and cuts out of circuit the switch 72. This circuit releases the hook 57, allowing it to enter the notch of the disk 59, to connect the timing shaft with the crank disk and forces the plunger of the solenoid 47ª into a recess of the plate 31ª. The connection of the timing shaft with the crank disk results in the plates 29 and 29ª being reciprocated in opposite directions, whereby the slide 31 is actuated to cause the gear 35 to move out of mesh with the gear 40 and into its neutral position shown in Fig. 1 during the frontward movement of the plate 29ª and the slide 31ª which is now connected with the plunger of the magnet 47ª, as shown in Fig. 10, is actuated to cause the gear 35ª to move from its neutral position shown in Fig. 1 into mesh with the gear 39, which corresponds with the second or intermediate speed.

To change to the third or highest speed, a third button is depressed, and a circuit is established through the solenoids 48 and 63 in series with the source and breaks the circuit of the solenoid 47. This brings the plunger of the solenoid 48ª within a recess of the plate 31ª and results in the plunger of the solenoid 47ª releasing said slide 31ª which is then actuated by the plate 29 to cause the gear 35ª to move out of mesh with the gear 39 and then to be actuated by the plunger of the solenoid 48ª to move rearwardly and to cause the gear 35ª to move rearwardly from its neutral position and in coupling the gear 35ª with the gear 38, adapted to run the vehicle on its highest speed.

To stop the car, the button to cause contact between the terminal 67 and the terminal marked N is depressed. This establishes a circuit directly through the solenoid 63, which results in allowing the hook to connect the crank 24 with the disk 59, whereby the gears on the clutch shaft are disconnected from the other gears of the box 30, and as this button has no catch it assumes its normal position when released, breaking all the circuits with the gears disconnected, which results in the stopping of the vehicle.

To reverse the car, the pedal and the button adapted to connect the terminal 67 with the terminal marked R are depressed.

This establishes a circuit through the solenoids 47ª and 63, and results in bringing the gear 35 in mesh with the idler which is in mesh with the gear 41.

Thus far the change of speed was accomplished by the operation of buttons.

To effect the automatic change in speed, the pedal and a button adapted to connect the terminal 67 with the terminal marked F are depressed.

This establishes a circuit by way of the terminals 73 and 75 through the solenoid 48ª, pedal switch 72 and solenoid 63 all in series with the source 65. This corresponds with the starting of the car ahead on the first speed. As the car picks up its speed, the arms of the governor lever 92 are urged centrifugally causing the spool 95 to move rearwardly until the terminal jumps the insulator 103 and drops on the terminal 76. This establishes a circuit through the solenoids 47 and 63 in series with the source 65 which corresponds with the circuit adapted to throw the vehicle on its second speed. As the car picks up on its said second speed, the arms of the lever fly out farther, which results in causing the terminal 73 to jump the insulator 104 and to drop into the terminal 77. This establishes a circuit corresponding with the one adapted to throw the vehicle in its third or highest speed.

By moving the handle 13 the vehicle can be held on its second speed as follows:—The movement of the handle is transmitted by rods 109 and 108 to the bell crank 106 mounted on the bracket 107 of the box 74. The motion of the lever is transmitted by the rod 105 to the insulator connecting the terminals 76 and 77. When these terminals are moved rearwardly, the terminal 73 is prevented from jumping the insulator 104, which results in holding the car on its second speed.

Having thus described my invention, what I claim as new and desire to protect by Letters Patent is

1. In combination in a power driven vehicle a source of power, a gear shifting mechanism, mechanical means whereby the power is transmitted to said gear shifting mechanism, and electromagnetic means adapted to operate the said mechanical means.

2. In combination in a power driven vehicle a source of power, a gear shifting mechanism, mechanical means adapted to transmit the power to the gear shifting means, electromagnets adapted to control said transmitting means, a source of electric current for said magnets, and means for breaking the circuit of said source.

3. In combination in a power driven vehicle a source of power gear shifting mechanism, means for transmitting the power to said shifting mechanism, electromagnetic means adapted to set the transmitting means in operation and to control said electromagnetic means.

4. In a power transmitting mechanism a power driven disk, a crank, means connecting the crank with the disk, and means for disconnecting the crank from the disk.

5. In a power transmitting mechanism a rotating disk, a crank adapted to be rotated by the disk, means connecting the crank with the disk, and means for disconnecting said crank and disk.

6. In a power transmitting mechanism, a rotating disk, an intermittently rotating crank, and means for connecting and disconnecting the crank and disk.

7. In a transmitting mechanism, a rotating disk, a crank, connecting means between said disk and crank, and an electromagnet adapted to operate the connecting means so as to disconnect the disk and crank.

8. In a transmitting mechanism, a rotating disk, a casing therefor, a crank connected with said casing, means for connecting the casing with the disk, and means for disconnecting the casing and disk.

9. In combination with two rotating members, a crank adapted to be rotated by one of said members, and a clutch adapted to be rotated by the second member, and means for preventing the rotation of the crank during the movement of the clutch and vice versa.

10. In combination in a power driven vehicle, a source of power, a driven element means for varying the speed of the driven element, operating means therefor, a switch governing the operating means, and consisting of an element operated by the speed of the driven element and a manually operated element, said elements being adapted to move relatively and to be in contact with each other for varying the power applied to the vehicle.

11. In combination in a power driven vehicle driven element gear shifters, a rotating disk, a crank adapted to be operatively connected with said disk, means operatively connecting the crank with the shifters and adapted to move said shifters in opposite directions.

12. In combination in a power driven vehicle, a power supplying means, a driven element, gear shifters and a clutch adapted to connect the power supplying means from the driving means of the vehicle, a disk connected to rotate with the power supplying means, a crank operatively connected with said disk, means operatively connecting the crank with shifters, and means adapted to operatively connect the clutch with the crank to cause the clutch to disconnect the power supplying means from the vehicle driving means.

13. In a motor driven vehicle, a driving shaft, speed changing devices, a clutch driven by the motor, adapted to connect the motor with any one of said speed changing devices, and a motor driven cam adapted firstly to disconnect the clutch from the motor, secondly to disconnect a speed changing device from the clutch and then connect a second speed changing device with the clutch, and finally to permit the clutch to be connected with the motor.

14. In an interchange speed gear mechanism, the combination with the driving element and a plurality of change gear operating means, of means adapted to be thrown in and out of connection with the driving element for actuating any one of the aforesaid operating means.

15. In an interchange speed gear mechanism, the combination with the engine shaft, and plurality of change gear operating shifters, of means adapted to be thrown in and out of connection with the engine shaft for operating any one of the aforesaid shifters, as and for the purpose set forth.

16. In an interchange speed gear mechanism, the combination with the engine shaft, and plurality of change gear operating elements, of means adapted to be thrown in and out of connection with the engine shaft for operating any one of the aforesaid operating elements.

17. In an interchange speed gear mechanism, the combination with the engine shaft and plurality of change gear operating elements, of means adapted to be thrown in and out of connection with the engine shaft for operating any of the aforesaid elements, and an independently operated element selecting device whereby the element desired is placed in operative connection with the engine shaft.

18. In an interchange speed gear mechanism, the combination with the engine shaft and plurality of change gear operating means, of means adapted to be thrown in and out of connection with the engine shaft for operating any one of the aforesaid operating means, and means for initially throwing the engine clutch out of connection.

19. In an interchange speed gear mechanism, the combination with the engine shaft, and plurality of change gear operating elements, of means adapted to be thrown in and out of connection with the engine shaft for operating any of the aforesaid elements, an independently operated element selecting device whereby the element desired is placed in operative connection with the engine shaft, and means for initially throwing the engine clutch out of connection, and automatic means for again throwing the engine clutch into engagement.

20. In an interchange speed gear mechanism, the combination with the engine shaft, and a plurality of change gear operating shifters, of means operated by the engine shaft adapted to be thrown in and out of connection therewith for operating any of the aforesaid shifters, an independently operated shifter selecting device whereby the shifter desired is placed in operative connection with the engine shaft, automatic means for initially throwing the engine clutch out of connection, automatic means for again throwing the engine clutch into gradual connection and automatic means for finally throwing the shifter operating mechanism out of connection with the engine shaft, as and for the purpose specified.

21. In an interchange speed gear mechanism, the combination with the engine shaft, and a plurality of change gear operating elements, of means operated by the engine shaft adapted to be thrown in and out of connection therewith for operating any of the aforesaid elements, an independently operated element selecting device whereby the element desired is placed in operative connection with the engine shaft, automatic means for initially throwing the engine clutch out of connection, automatic means for again throwing the engine clutch into connection, and automatic means for finally throwing the element operating mechanism out of connection with the engine shaft.

22. In combination with an interchange speed gear mechanism, of a power driven machine, a throttle-lever controlling means, a speed-selector adapted to establish a selective interchange of the speed gears including relatively movable members, and means operatively connecting said members with said lever controlling means.

23. In combination with a throttle-lever controlling means of a power-driven machine, speed changing devices, means including relatively movable members, adapted to actuate the speed changing devices to establish a selected operative connection between said speed changing devices and the driving power, and connecting means between one of said members and said controlling means.

24. In combination with the power controlling handle of a machine, speed changing driving and driven elements, means, including a plurality of relatively movable members adapted to establish a selective operative connection between the driving and the driven elements, one of said members depending for its movement upon the speed of the driven element and another depending for its movement upon that of the power controlling handle.
25. In combination with driving and driven elements and with means for controlling the power of the driving element, a plurality of relatively movable members adapted to establish a selective operative connection between the driving and the driven elements, one of said members being operatively connected with the driven element and another with the power controlling means.
26. In combination with the prime mover of a machine provided with speed changing devices, means for actuating said devices, and means adapted to establish a selective operative connection between the prime mover and the actuating devices.

27. The combination with the prime mover of a machine provided with speed changing devices including shifters, and means adapted to establish a selective operative connection between the prime mover and the shifters.

28. The combination with a prime mover, of a selectively variable speed mechanism, a clutch, and means operated by said prime mover for operating the clutch and concurrently effecting a selected change in the variable speed mechanism.

29. In an interchange speed gear mechanism, the combination with the engine shaft, and plurality of change gear operating elements, means for selecting the element, and means adapted to be thrown in and out of connection with the engine shaft for operating the preselected element, as and for the purpose set forth.

30. The combination with a prime mover, of selectively variable speed mechanism, a clutch and means operated by said prime mover for operating the clutch and concurrently effecting a preselected change in the variable speed mechanism, substantially as set forth.

31. The combination with a prime mover, of selectively variable speed mechanism, a clutch adapted to connect the prime mover with the variable speed mechanism, and means operable from the prime mover for operating the clutch and concurrently effecting a preselected change in the variable speed mechanism, substantially as set forth.

32. The combination with a prime mover, of selectively variable speed mechanism, a clutch, means operated by said prime mover for operating said clutch and concurrently effecting a preselected change in said variable speed mechanism and means for bringing said means into action at will, substantially as set forth.

33. The combination with a prime mover and an element to be driven thereby, of interposed variable speed mechanism and a clutch, and means operated by said prime mover for operating the clutch and effecting a preselected change in the variable speed mechanism, substantially as set forth.

34. The combination with a prime mover and an element to be driven thereby, of an interposed clutch, and means driven by said prime mover for automatically operating said clutch, said automatic means being manually controlled, substantially as set forth.

35. The combination with a prime mover and an element to be driven thereby, of an interposed variable speed mechanism adapted to transmit the power of the prime mover to the driven element, means adapted to preselect the speed of the driven element, and means adapted to prevent said transmission of power and means to cause the prime mover to selectively connect the variable speed mechanism with the driven element.

36. In combination with a prime mover, a gear shifting mechanism comprising a shift rod and two members movable longitudinally of the rod in opposite directions, means for selectively connecting said members to the shift rod and means for connecting the prime mover with said members.

37. In combination with a prime mover, a gear shifting mechanism including a shift rod and two members movable longitudinally of the rod in opposite directions, means carried by the said members for connecting them to the shift rod, means for selectively controlling the said connecting means, and means for connecting said prime mover with said members.

38. In combination with a prime mover, a gear shifting mechanism including a shift rod and two members movable longitudinally of the rod in opposite directions, means for connecting the said members to the shift rod, means for preventing the connection of said parts, means for selectively controlling said preventive means, and means for connecting the said prime mover with the said members.

39. In combination with a prime mover, a gear shifting mechanism including a shift member and two members movable relatively to the shift member, means for connecting the latter members to the shift member, means for preventing the connection of said members, means for selectively controlling the preventing means, and means for connecting said prime mover with the said relatively movable members.

40. In combination with a prime mover, a gear shifting mechanism including a plurality of shiftable members and a plurality of members that are movable relatively thereto, a plurality of pivotally mounted levers for connecting said movable members to said shiftable members, means for selectively controlling said levers, and means for connecting said prime mover with said movable members.

41. In a power driven vehicle, a power supply, power controlling means, a driven mechanism and speed changing devices adapted to selectively connect the driven mechanism with its power supply, and means adapted to be actuated by the power controlling means to establish said selective relation.

42. In combination with the prime mover of a vehicle, a gear shifting mechanism, means whereby the power of the prime mover is transmitted to said mechanism, and electromagnetic means for controlling said transmitting means.

43. The combination in a power driven vehicle, of a power element, variable speed mechanism, a clutch adapted to connect the power element to the variable speed mechanism, a gear shifting device, means for connecting the shifting device with the power element, means to cause the shifting device; firstly, to operate the clutch and disconnect the power element from the variable speed mechanism; secondly, to neutralize the variable speed mechanism; thirdly, to bring into effect a new relation in the variable speed mechanism; and lastly, to permit the clutch to connect the power element with the variable speed mechanism, and means to disconnect the shifting device from the power element.

44. In combination with a prime mover of a machine, a plurality of speed change devices, means adapted to be thrown in and out of connection with the prime mover for causing an interchange of any of the aforesaid speed changing devices.

45. In a power driven vehicle, a power element, a driven element, throttle controlling means, a clutch, mechanism adapted to operate the same, and means for connecting the throttle controlling means with the clutch operating mechanism to cause the clutch to disconnect the power element from the driven element.

46. In a power driven vehicle, a power element, a driven mechanism throttle controlling means, a clutch, normally adapted to connect the driven mechanism with its power supply, means for actuating the clutch to disconnect the driven mechanism from its power supply, and means for connecting the throttle controlling means with their clutch operating means to cause the clutch to disconnect the driven mechanism from its power supply.

In testimony whereof I have signed this specification in the presence of two subscribing witnesses.

JOHN H. STORTZ.

Witnesses:
C. WILSON ROBERTS,
HELEN M. BAKER.